United States Patent

Uchiyama et al.

[11] Patent Number: 5,134,109
[45] Date of Patent: Jul. 28, 1992

[54] CATALYST FOR REFORMING HYDROCARBON WITH STEAM

[75] Inventors: Souichi Uchiyama, Tokyo; Hiroto Matsumoto; Tomoki Yanagino, both of Sodegaura, all of Japan

[73] Assignee: Idemitsu Kosan Company Limited, Tokyo, Japan

[21] Appl. No.: 548,534

[22] Filed: Jul. 5, 1990

[30] Foreign Application Priority Data

Jul. 7, 1989 [JP] Japan ................... 1-176543
Jul. 7, 1989 [JP] Japan ................... 1-176544
Mar. 30, 1990 [JP] Japan ................... 2-83058

[51] Int. Cl.$^5$ ............. B01J 21/06; B01J 23/58; B01J 23/64; B01J 23/89
[52] U.S. Cl. ............. 502/324; 502/325; 502/326; 423/652
[58] Field of Search ............. 502/325, 326, 324; 423/652

[56] References Cited

U.S. PATENT DOCUMENTS 3,222,132 12/1965 Dowden ............. 423/652
4,367,166 1/1983 Fujitani et al. ............. 252/462

FOREIGN PATENT DOCUMENTS 0010114 4/1980 European Pat. Off. .
0024199 2/1981 European Pat. Off. .
2736996 3/1978 Fed. Rep. of Germany .
1240453 7/1971 United Kingdom .

*Primary Examiner*—W. J. Shine
*Attorney, Agent, or Firm*—Nikaido, Marmelstein, Murray & Oram

[57] ABSTRACT

A catalyst for reforming a hydrocarbon with steam has a platinum group metal deposited on a carrier having a volume of pores with pore sizes of 500 Angstroms or smaller being 0.15 ml per gram or greater, a volume of pores having pore sizes of more than 500 Angstroms being 0.14 ml per gram or smaller, and an average pore size being 90 Angstroms or greater. The platinum group metal specifically includes rhodium and ruthenium, and the carrier preferably includes zirconia and stabilized zirconia. As a promoter component, at least one metal of cobalt and manganese is used. The catalyst is high in catalytic activity and long in catalytic life.

19 Claims, 2 Drawing Sheets

FIG.1

FIG.2 ated hydrogen manufacturing plants.

CATALYST FOR REFORMING HYDROCARBON WITH STEAM

BACKGROUND OF THE INVENTION

1. Field of the Invention

The present invention relates to a catalyst for reforming hydrocarbon with steam and, more particularly, to a catalyst for reforming hydrocarbon with steam, which has a high catalytic activity and a long catalyst life as well as which can appropriately be utilized, for example, for plants for manufacturing hydrogen for fuel cells or compact hydrogen manufacturing plants.

2. Description of Related Art

Various catalysts have been proposed as catalysts for promoting the reaction for reforming a hydrocarbon with steam into hydrogen, carbon monoxide, carbon dioxide and methane. For example, Japanese Patent Examined Publication (kokoku) No. 29,435/1964 discloses a catalyst for reforming the hydrocarbon with steam, which has a platinum group metal deposited on a heat-resistant oxide. This patent publication, however, does not refer to the structural feature of a simple substance for the catalyst composition.

Japanese Patent Unexamined Publication (kokai) No. 50,533/1982 discloses a porous alumina body with nickel oxide deposited thereon, which is characterized in that the volume of fine pores having pore sizes ranging from 60 to 120 Angstroms is 0.35 ml per gram or more and the volume of fine pores having pore sizes of 120 Angstroms or larger is 0.1 ml per gram or more.

Japanese Patent Unexamined Publication (kokai) No. 112,840/1984 discloses a catalyst composition for manufacturing fuel gases, which uses a catalyst carrier in which the pore volume of the micropores having pore sizes ranging from 100 to 10,000 Angstroms accounts for 40% or more of the total pore volume of the carrier.

The conventional catalysts including those described hereinabove, however, present the problem that they cannot satisfy increasing demands from the industry sector for catalysts with higher catalytic activity and longer catalyst life.

For instance, plants for manufacturing hydrogen for fuel cells, and so on, have made demands to develop catalysts for reforming with steam having the catalyst life longer than those used for existing devices for manufacturing hydrogen. However, nickel catalysts industrially available as of today as the catalyst for reforming with steam cause carbon to precipitate on a surface of the catalyst to an extremely large extent so that they do not provide the long catalyst life as desired.

Therefore, recently, much attention is focused on a catalyst system with a noble metal deposited on a zirconium type carrier, not on the nickel type catalysts, as a catalyst system having a high catalytic activity at low temperatures and suppressing deposition of carbon.

Japanese Patent Examined Publication (kokoku) No. 2,922/1977 discloses a catalyst for reforming with steam consisting of nickel and/or cobalt, a platinum group metal, an alkaline earth metal and a refractory support material such as zirconia. However, this publication does not provide any working example about cobalt and specify the kind of the alkaline earth metal. Further, little review has been made of the effect on the catalyst life.

Japanese Patent Unexamined Publication (kokai) No. 91,844/1981 indicates that a catalyst with rhodium deposited on the zirconia carrier has a catalytic activity higher than the nickel type catalyst. This publication, however, does not provide any review of its catalytic life, and there is the problem that the catalytic life of the rhodium/zirconia catalyst is insufficiently long.

Further, Japanese Patent Unexamined Publication (kokai) No. 38,239/1988 discloses that the catalyst for reforming with steam in which ruthenium and barium are deposited on the alumina carrier is higher in catalytic activity than other catalysts. This publication is also silent about the catalytic life and the alumina carrier is not said to be appropriate for ruthenium.

A. Igarashi et al. (A. Igarashi et al.: 62nd Shokubai Toronkai; 3B305, Sendai) indicate that catalysts having rhodium and a variety of oxides as a third component deposited on the zirconia carrier are higher in catalytic activity at low temperatures. This report, however, does not refer to the catalytic life, and the catalytic life cannot be anticipated from data of catalytic activity because there is not necessarily any relationship of the order of the catalytic activity at low reaction temperatures with the catalytic life.

SUMMARY OF THE INVENTION

The present invention has the object to provide a catalyst for reforming a hydrocarbon with steam, having a high catalytic activity and a long catalytic life.

For various proposals made so far for the catalysts not been made yet of the relationship of the catalytic life with the distribution of pores although the relationship of the catalytic activity with the distribution of pores has been reviewed. Hence, as a result of extensive review of the relationship of the catalytic life and the catalytic activity with the distribution of pores, it now has been found that there is an optimal distribution of pores for a catalyst carrier which is required for maintaining a high activity and realizing a long catalytic life.

In order to achieve the object, the present invention consists of a catalyst for reforming a hydrocarbon with steam, wherein a platinum group metal is deposited on a carrier having a volume of pores with pore sizes of 500 Angstroms or smaller being 0.15 ml per gram or greater, a volume of pores having pore sizes of more than 500 Angstroms being 0.14 ml per gram or smaller, and an average pore size of 90 Angstroms or greater.

More specifically, the catalyst according to the present invention is characterized in that at least one metal of rhodium and ruthenium and at least one metal of cobalt and manganese are deposited on the carrier consisting of at least one of zirconia and stabilized zirconia.

DESCRIPTION OF THE PREFERRED EMBODIMENTS

The present invention will be described more in detail.

Carrier

A material of the carrier to be used for the catalyst according to the present invention is not restricted to a particular one as long as it can be used as the catalyst carrier with a sufficiently high durability in the atmosphere in which the hydrocarbon is reformed with steam and, preferably, the catalyst is regenerated. The material of the carrier may include, for example, an oxide including a simple oxide, a composite oxide or a oxide type composition, a non-oxide material or a combination of an oxide with a non-oxide or a mixture thereof. Of the materials of the carrier, the oxide having heat resistance may appropriately be used.

Such a heat-resistant oxide carrier may include, for example, alumina, magnesia, silica, zeolite, titania, zirconia or stabilized zirconia, yttrialite, silica alumina, alumina boria, silica titania, silica zirconia or a carrier containing it as a major component. Of the heat-resistant oxide carriers, a zirconia type carrier is particularly preferred. The zirconia type carrier may include, for example, zirconia carrier, stabilized zirconia carrier and other zirconia-containing carriers. The zirconia carrier and the stabilized zirconia carrier are preferred.

The heat-resistant oxide carrier may contain impurities or additives as long as they do not impair the object of the present invention.

These carriers may be used singly or in combination of two or more or as composites.

Detailed description will further be made of the zirconia carrier and the stabilized zirconia carrier.

As the zirconia carrier, zirconium oxide ($ZrO_2$) may appropriately be used and the carrier containing zirconium oxide as a major component may also be used. Further, there may be used, as the zirconia carrier, a substance that can be converted into zirconium oxide or one containing zirconium oxide as a major component during preparation for the catalyst or during reaction for reforming with steam. Zirconium oxide may be commercially available or prepared so as to meet demands.

The substance capable of being converted into zirconium oxide during preparation for the catalyst or during reaction for reforming with steam may include, for example, zirconium hydroxide, a zirconium halide such as zirconium chloride, a zirconium oxyhalide such as zirconium oxychloride, zirconium nitrate, zirconyl nitrate, a zirconium salt of an organic acid such as zirconium acetate and zirconium oxalate, a zirconyl of an organic acid such as zirconyl acetate, a zirconium alkoxide, an organic zirconium compound, etc.

The above compounds which are less soluble may be solubilized by adding an acid or the like.

The method for conversion of the zirconium compound into zirconium oxide is not restricted to a particular one, and conversion may be performed by heat decomposition method, precipitation method, hydrothermal crystallization method, etc.

Zirconyl nitrate may be converted into zirconium oxide by co-precipitating zirconyl nitrate with ammonia water and thermally decomposing the substance co-precipitated. The zirconium alkoxide may be converted into zirconium oxide by hydrolysis.

The zirconium oxide to be used as the carrier may be anhydrous or in such a form as containing water of crystallization.

The foregoing zirconium compounds may be used singly or in combination with two or more.

The stabilized zirconia carrier is provided with peculiar properties such as improved heat resistance and mechanical strength as stabilized zirconia, resulting from addition of a stabilizing agent, as well as with the excellent properties as a carrier that reactivity of zirconia itself with water is made particularly high, the ability of reforming the hydrocarbon with steam is improved, and precipitation of carbon onto the catalyst can be prevented. For example, the stabilized zirconia carrier does not cause a decrease in its surface area at temperatures as high as 500° C. or higher, thereby permitting use in a stable fashion.

The stabilized zirconia carrier may be prepared by adding the stabilizing agent to thereby modify its zirconia component into a stabilized form. As the zirconia component of the stabilized zirconia carrier, the zirconia carrier may be used as it is. In other words, the zirconia component may be obtained from a variety of the zirconium compounds such as zirconium oxide or the like.

The stabilizing agent may include an oxide component known to the art, which may be used, for example, as a yttrium oxide component, a magnesium oxide component, a cerium oxide component or a so-called stabilizing component of the stabilized zirconia. Of these oxide components, the yttrium oxide component, the magnesium oxide component and the cerium oxide component are preferably used. The yttrium oxide component, the magnesium oxide component, and the cerium oxide component may be represented empirically by $Y_2O_3$, $MgO$, and $CeO_2$, respectively.

The source of yttrium to be used as a raw material for preparation of the yttrium oxide component may include, for example, yttrium oxide or a substance capable of being converted into yttrium oxide (yttrium oxide component) during preparation for the catalyst or during reaction for reforming with steam.

The substance to be converted into the yttrium oxide component may include, for example, yttrium hydroxide, a yttrium halide, a yttrium oxyhalide, an inorganic acid salt of yttrium such as yttrium nitrate or yttrium carbonate, an organic acid salt of yttrium such as yttrium acetate or yttrium oxalate, an yttrium alkoxide such as yttrium trimethoxide, yttrium triethoxide, yttrium tripropoxide, yttrium triisopropoxide or yttrium tributoxide, and so on. The yttrium alkoxide is particularly preferred.

The source of magnesium to be used as a raw material for preparation of the magnesium oxide component may include, for example, magnesium hydroxide or a substance capable of being converted into magnesium oxide (magnesium oxide component) during preparation for the catalyst or during reaction for reforming with steam.

The substance to be converted into the magnesium oxide component may include, for example, magnesium hydroxide, a magnesium halide, an inorganic acid salt of magnesium such as magnesium nitrate or magnesium carbonate, an organic acid salt of magnesium such as magnesium acetate or magnesium oxalate, a magnesium alkoxide such as magnesium methoxide, magnesium ethoxide, magnesium propoxide, magnesium isopropoxide or magnesium butoxide, and so on. The magnesium alkoxide is particularly preferred.

The source of cerium to be used as a raw material for preparation of the cerium oxide component may include, for example, cerium oxide or a substance capable of being converted into cerium oxide (cerium oxide component) during preparation for the catalyst or during reaction for reforming with steam.

The substance for conversion into the cerium oxide component may include, for example, cerium hydroxide, a cerium halide, a cerium oxyhalide, an inorganic acid salt of cerium such as cerium nitrate or cerium carbonate, an organic acid salt of cerium such as cerium acetate or cerium oxalate, a cerium alkoxide such as cerium methoxide, cerium ethoxide, cerium propoxide, cerium isopropoxide or cerium butoxide, and so on. The cerium alkoxide is particularly preferred.

The yttrium compound, magnesium compound and cerium compound may be used singly or in combination of two or more.

Of the compounds enumerated hereinabove, the compounds which are less soluble may be used after solubilization by addition of an alcohol or an acid.

In accordance with the present invention, the carrier such as the heat-resistant oxide carrier or the like may be used selectively from carriers having characteristics of following (1)–(3) about pores.

Characteristic of pores (1) Volume of pores in pore sizes of 500 Å or smaller is;
 usually 0.15 ml per gram or larger, preferably 0.17 ml per gram or larger, and more preferably 0.17–0.22 ml per gram.

(2) Volume of pores in pore sizes of more than 500 Å is;
 usually 0.14 ml per gram or lesser, preferably 0.10 ml per gram or lesser, and more preferably 0.05 ml per gram or lesser.

(3) Average pore size of pores is; usually 90 Å or larger, preferably 90–350 Å, and more preferably 90–200 Å.

The pore sizes and the volume of the pores of the carrier to be used for the present invention are measured when the distribution of the fine pores are observed in the range from 30 to $3.5 \times 10^5$ Angstroms by means of the mercury intrusion method. Hence, the pore sizes, ranges and volumes of the pores are defined on the basis of the distribution of the pores in the range from 30 to $3.5 \times 10^5$ Angstroms when measured by the mercury intrusion method.

Thus, when this specification refers to the pore sizes being 500 Angstroms or smaller or larger, they are meant to refer to pores having pore sizes in the range from 30 to $3.5 \times 10^5$ Angstroms measured by the mercury intrusion method. Therefore, if the volume of the pores having the pore sizes of 500 Angstroms or smaller, the pore volume referred to, for example, as 0.15 ml per gram or 0.17 ml per gram, does not refer to pores having pore sizes outside the lower range of 30 Angstroms, i.e., pore sizes having smaller than 30 Angstroms. Likewise, when the volume of the pores having the pore sizes of more than 500 Angstroms, the pore volume defined herein does not refer to pores having the pore sizes exceeding $3.5 \times 10^5$ Angstroms.

In other words, the carrier to be used for the catalyst according to the present invention is not restricted to any pore sizes or any volume of pores with the pore sizes outside the range from 30 to $3.5 \times 10^5$ Angstroms when measured by the mercury intrusion method.

It is to be noted that the conditions of the fine pores of the carrier are of significance for realizing a high activity and long catalytic life of the catalyst according to the present invention because the conditions of the fine pores govern a dispersing velocity of a reactive substance and so on. In summary, no high catalytic activity can be achieved unless the carrier used have 0.15 ml per gram or greater of the volume of the fine pores having pore sizes of 500 Angstroms or smaller and an average pore size of 90 Angstroms or greater. Further, no high catalytic activity can be maintained in a stable fashion and the catalytic life can be shortened unless the volume of the fine pores having pore sizes of more than 500 Angstroms would reach 0.14 ml per grams or smaller.

The carrier having the fine pore characteristics as described hereinabove to be used for the present invention may be prepared as follows.

For instance, as referred to in Japanese Patent Unexamined Publication (kokai) No. 120,508/1981, the precipitation method involves growing precipitated particles by elevating or lowering pH values during formation of precipitation and eventually changing pore sizes of the carrier. As the pulverization method, there may be enumerated a process for controlling particle sizes by sintering powdery particles and eventually changing the particle sizes of the carrier.

It is to be noted herein that, even if the volume and the average pore size of the fine pores of the carrier would be outside the ranges defined hereinabove, the objects of the present invention can be achieved if a particular catalyst would be such that the carrier is selected from zirconia and stabilized zirconia and a main catalyst component is selected from at least one of rhodium and ruthenium while a promoter component is selected from at least one of cobalt and manganese and, if needed, from at least one of barium and potassium. It is preferred, however, that the particular catalyst should be obtained from the carrier having the volume of the fine pores and the average pore size within the ranges as defined hereinabove.

The shape of the carrier is not restricted to a particular one and may include, for example, finely divided form, granules, beads, pellets, plates, films, monolithic form and so on.

Components To Be Deposited

1. Main Catalyst Component

The catalyst according to the present invention for reforming the hydrocarbon with steam is composed of a platinum group metal deposited on the carrier having the particular pore characteristics as described hereinabove. As the carrier, there may be used the heat-resistant oxide carrier, preferably the zirconia type carrier, more preferably the zirconia carrier and the stabilized zirconia carrier.

The platinum group metal may include, for example, ruthenium, rhodium, palladium, osmium, iridium and platinum. Ruthenium and rhodium are preferred, and ruthenium is more preferred. These metals may be used singly or in combination of two or more.

The source of ruthenium may be, for example, a ruthenium halide such as ruthenium iodide and ruthenium chloride, a ruthenic halide such as ruthenic chloride, a ruthenic chloride salt such as ammonium ruthenic chloride, sodium ruthenic chloride and potassium ruthenic chloride, ruthenium hydroxide, a ruthenium oxide such as ruthenium dioxide or ruthenium tetroxide, a ruthenic acid salt such as potassium ruthenate and sodium ruthenate, an organic ruthenium compound such as ruthenium carbonyl, a metallic ruthenium such as ruthenium colloid, and so on. Of these ruthenium sources, ruthenium chloride is preferred. The ruthenium source may be used singly or in combination of two or more.

The source of rhodium for depositing rhodium metal on the carrier may include, for example, a rhodium halide such as rhodium chloride, a rhodic acid halide such as rhodic chloride, a rhodic acid halide salt such as ammonium rhodic chloride, sodium rhodic chloride and potassium rhodic chloride, rhodium (III) hydroxide, rhodium (IV) hydroxide, rhodium nitrate, rhodium oxide, an organic rhodium such as rhodium carbonyl, a metallic rhodium such as rhodium colloid, and so on. The rhodium sources may be used singly or in combination of two or more.

The amount of the platinum group metal to be deposited on the carrier may vary with the kind or composition of the metal components to be deposited or the kind of the carrier or other conditions so that it cannot equally be determined as a whole. The amount of the platinum group metal may range generally from 0.01 to 5% by weight, preferably from 0.1 to 3% by weight. When ruthenium and/or rhodium are/is deposited as a preferred example of the platinum group metal, the amount of ruthenium or rhodium or a combination of ruthenium with rhodium may appropriately be selected from the scope ranging usually from 0.01 to 5% by weight, preferably from 0.1 to 3% by weight. When the zirconia carrier or the stabilized zirconia carrier is used as the carrier, the amount of ruthenium and/or rhodium may range usually from 0.05 to 3.0% by weight, preferably from 0.1 to 2.0% by weight.

If the amount of the platinum group metal is below the lower limit, on the one hand, it may not function as a catalyst to a sufficient extent. If the amount of the platinum group metal is above the upper limit, on the other, the catalytic effect may not be achieved as expected by addition of such a large amount of the platinum group metal.

2. Promoter Component

The catalyst for reforming the hydrocarbon with steam according to the present invention may contain a promoter component, in addition to the main catalyst component selected from the platinum group metal. The promoter component can function as further improving an activity of the catalyst for reforming the hydrocarbon with steam and prolonging the life of the catalyst therefor.

The promoter component comprises an element capable of providing the catalyst with a promoting function, which may include, for example, cobalt and/or manganese, although a variety of elements can be used.

Hence, the reforming catalyst for the hydrocarbon according to the present invention may preferably be constructed such that the platinum group metal (rhodium and/or ruthenium being particularly preferred) is deposited on the carrier, preferably on the zirconia type carrier, more particularly on the zirconia carrier or the stabilized zirconia carrier, and further that cobalt and/or manganese are/is deposited thereon as the element or elements for providing the catalyst with the promoting function. Cobalt and manganese may be used singly or in combination with each other.

The sources of cobalt and manganese may include, for example, a halide, an inorganic acid salt such as a sulfate, nitrate, carbonate or the like, an organic acid salt such as an acetate, a hydroxide, an oxide, a basic salt, an alkoxide, an organic compound of these metals.

Specific examples of the cobalt source may be, for example, cobalt chloride (hexahydrate), cobalt chloride (anhydride), cobalt nitrate, cobalt sulfate, cobalt acetate, cobalt formate, cobalt oxalate, cobalt hydroxide, cobalt oxide, cobalt carbonate (basic cobalt carbonate), cobalt (II) acetylacetonate, cobalt (III) acetylacetonate, cobalt carbonyl, and so on. Of these cobalt sources, cobalt nitrate is preferred.

It is to be understood that specific examples of the manganese source may be selected from those enumerated hereinabove by replacing the term "cobalt" of the above-stated specific examples of the cobalt sources by the term "manganese". The preferred example of the manganese source is manganese nitrate.

The amount of the promoter component may vary with the kind or composition of the component to be deposited or the kind of the carrier or other conditions so that it may be selected with these matters taken into consideration. For instance, when the zirconia carrier or the stabilized zirconia carrier is used as the carrier, the amount of the promoter component selected from the sources of cobalt and manganese may appropriately range usually from 0.1 to 10.0% by weight, preferably from 0.2 to 5.0% by weight, with respect to the weight of the carrier.

For the catalyst for reforming the hydrocarbon with steam in which rhodium is deposited as the platinum group metal, on the one hand, the amount of the promoter component selected from the cobalt sources and/or the manganese sources may range usually from 1.0 to 5.0% by weight with respect to the weight of the carrier. When ruthenium is deposited as the platinum group metal, on the other, the amount of the promoter component selected from the cobalt sources and/or the manganese sources may range usually from 0.1 to 2.5% by weight with respect to the weight of the carrier.

It is to be noted herein that the amount of the component deposited is represented by % by weight when calculated as cobalt and manganese which are translated into the respective element and that, when both are deposited, the amount means a total of the two elements.

It can be noted that, in instances where the amount of cobalt and/or manganese is within the above range, the catalyst can maintain its high catalytic activity and reduce its speed of deterioration to a sufficiently low extent.

It can further be noted that the catalyst for reforming the hydrocarbon with steam according to the present invention can demonstrate further improved properties as to its high catalytic activity and stability when potassium and/or barium are/is deposited in addition to cobalt and/or manganese.

In a further preferred aspect of the present invention, the catalyst for reforming the hydrocarbon with steam may comprise the platinum group metal, particularly preferably ruthenium, as well as cobalt and/or manganese and potassium and/or barium, deposited on the carrier, preferably the zirconia type carrier, more preferably the zirconia carrier or the stabilized zirconia carrier.

The sources of potassium and barium may include, for example, a halide, an inorganic acid salt (neutral, acid or basic) such as sulfate, nitrate, carbonate or the like, an organic acid salt such as acetate, hydroxide, oxide, alkoxide, an organic compound of these metals.

Specific examples of the potassium source may include, for example, potassium chloride, potassium nitrate, potassium sulfate, potassium carbonate, potassium acetate, potassium hydroxide, potassium alkoxide, and so on. Potassium nitrate is preferred.

Specific examples of the barium source may include, for example, barium chloride, barium nitrate, barium sulfate, barium carbonate, barium hydroxide, and so on. Barium nitrate is preferred.

The preferred amount of potassium and/or barium may vary with the kind or composition of the component to be deposited or the kind of the carrier or other conditions so that it may be selected with these matters taken into consideration.

For instance, when the zirconia carrier or the stabilized zirconia carrier is used as the carrier, the amount of the additive component selected from the sources of potassium and/or barium may appropriately range usually from 0.01 to 2.5% by weight, preferably from 0.01 to 1.0% by weight with respect to the weight of the carrier.

It is to be noted herein that the amount of the component deposited is represented by % by weight when calculated as potassium and barium which are translated into the respective element and that, when both are deposited, the amount means a total of the two elements.

When the amount of potassium and/or barium added is within the scope as specified hereinabove, the effect of addition of cobalt and/or manganese can further be improved.

Preparation for Catalyst

The reforming catalyst according to the present invention may be prepared by various methods, such as impregnation, ion exchange, wet adsorption, dry adsorption, CVD, solvent evaporation, dry mixing, wet mixing, spray coating or the like or a combination thereof. The depositing may be implemented, for example, by leaving at rest, stirring, solution flowing, solution refluxing, or the like.

The resulting catalyst may be used after appropriate calcining treatment, such as oxidation, reduction, modification or the like, or pre-treatment (such as activation).

Reaction for Reforming Hydrocarbon with Steam

The reforming catalyst according to the present invention serves as promoting the reaction for reforming the hydrocarbon with steam.

The hydrocarbon to be reformed is not restricted to a particular one and may be, for example, a linear or branched saturated, aliphatic hydrocarbon, usually having from 1 to 10 carbon atoms, including methane, ethane, propane, butane, pentane, hexane, heptane, octane, nonane, decane and so on, and an alicyclic saturated hydrocarbon including cyclohexane, methylcyclohexane, cyclooctane and so on. The hydrocarbon may be used singly or in combination of two or more or as various petroleum fractions.

The hydrocarbon is considered to be reacted with steam as follows.

$$C_nH_m + nH_2O \rightarrow nCO + (n+m/2) H_2 \quad (I)$$

$$C_nH_m + 2nH_2O \rightarrow nCO_2 + (2n+m/2) H_2 \quad (II)$$

(where n is a real number of 1 or larger; and
m is a real number of 2 or larger).

In addition to the reactions (I) and (II), it is considered that the hydrocarbon is decomposed into hydrogen and methane as represented by the formula (III) and further that reactions for equilibrium may occur as represented by formulas (IV) and (V).

$$C_nH_m + [\tfrac{1}{2} - (m-4n)/4]H_2O$$
$$\rightarrow [2n - (2+m)/4]CH_4 + [\tfrac{1}{2} - (m-4n)/4]CO + H_2 \quad (III)$$

$$CH_4 + H_2O \rightleftharpoons CO + 3H_2 \quad (IV)$$

$$CO + H_2O \rightleftharpoons CO_2 + H_2 \quad (V)$$

Theoretically, therefore, the amounts of the hydrocarbon and steam may stoichiometrically be determined according to the formulas (I) to (V) above. In using the catalyst according to the present invention, the amounts of the hydrocarbon and steam may be determined at a steam/carbon ratio ranging usually from 1/1 to 12/1, preferably from 2/1 to 8/1. A hydrogen-rich gas can be produced in a highly efficient and stable fashion in the steam/carbon ratio as specified hereinabove.

The reaction temperature may range usually from 500°0 C. to 900°0 C., preferably from 650°0 C. to 850°0 C. The reaction pressure may range usually from 0 to 50 kg/cm²G, preferably from 0 to 20 kg/cm²G.

The reaction may be carried out in a continuous manner or in a batchwise manner. The continuous reaction is preferred. The type of the reaction is not restricted to a particular one, and the reaction may be carried out by means of a fixed bed or a fluidized bed. The type of the reactor is not restricted to a particular ore and it may be a tubular reactor or the like.

With the arrangement as described hereinabove, the present invention allows the hydrocarbon to be reacted with steam in the presence of the catalyst according to the present invention, thereby yielding a mixed gas including hydrogen, carbon monoxide, methane and carbon dioxide. The mixed gas may be used for various uses as it is or it may be separated into the respective components for various uses.

The present invention will be described more in detail by way of examples with reference to comparative examples, in conjunction with the accompanying drawings.

EXAMPLES 1-9 AND COMPARATIVE EXAMPLES 1-5 a. Preparation for Carrier and Catalyst

Catalyst B

A solution of 80.6 grams of zirconyl chloride (zirconium oxychloride) in 1.5 liter of distilled water was heated to 60°0 C. (hereinafter referred to as solution 1). Separately, 583 ml of a solution (hereinafter referred to as solution 1) was prepared by adding an appropriate amount of distilled water to 58.3 ml of ammonia water. To 1 liter of the solution 1 was added 200 ml of the solution 2, and the mixture was adjusted to pH5.4, thereby precipitating zirconium hydroxide.

To this mixture was added 140 ml of the solution 1, and the mixture was adjusted to pH3.1. By alternately adding 30 ml of the solution 2 and 140 ml of the solution 1, the pH value was changed three times between pH5 to pH3. Finally, the PH value was adjusted to pH 8.5 by adding the rest of the solution 2, and the mixture was aged for 90 minutes.

The resulting precipitate was filtered off and washed with 20 liter of distilled water. After washing, the resulting product in a cake form was dried at 120°0 C. for 5 hour and calcined at 500°0 C. for 1 hour.

The resulting zirconia (25 grams) was impregnated with an aqueous solution of RuCl$_2\cdot$3H$_2$O containing 0.125 gram of Ru, thereby depositing ruthenium on the zirconia which in turn was dried at 120°0 C. for 6 hours and calcined at 500°0 C. for 1 hour and yielding catalyst B. It was found that the catalyst B deposited 0.5% by weight of ruthenium.

Catalyst A

The procedure of preparation for Catalyst B was followed except for mere addition of the solution 2 to the solution 1, thereby yielding catalyst A.

Catalyst C

The procedure of preparation for Catalyst B was followed except for repetitions of changing the pH value six times, thereby yielding catalyst C.

Catalyst D

The procedure of preparation for Catalyst B was followed except for using zirconia as a carrier, which was prepared by previously calcining zirconia (Zirconia "RC-100"; Daiichi Kigenso Kogyo K.K.) at 500°0 C. for 1 hour, thereby yielding catalyst D.

Catalyst E

A solution (1 liter) (hereinafter referred to as solution 3) was prepared by dissolving 142.9 grams of zirconyl nitrate (zirconium oxynitrate), and another solution (solution 4) was prepared by dissolving 27 grams of ammonium carbonate and 25 grams of ammonia water (28%) in 500 ml of distilled water was prepared. The solution 3 and the solution 4 were simultaneously added to 200 ml to distilled water at a given dropping velocity so as to maintain its pH value to pH4, and the mixture was stirred for 30 minutes, thereby forming a precipitated material which was filtered off and washed with 2 liter of distilled water, thereby yielding a product in a cake form. The product in the cake form was then treated in substantially the same manner as the procedure for preparing the catalyst B above, except for using this product in place of the product in the cake form used above, thereby yielding catalyst E.

Catalyst F

The procedure of preparation for Catalyst E was followed except for adjustment of the pH value to pH6 at the time when the solution 3 was mixed with the solution 4, thereby yielding catalyst F.

Catalyst G

The procedure of preparation for Catalyst D was followed except for using zirconia ("RC-50"; Daiichi Kigenso Kogyo K.K.), in place of zirconia ("RC-100"), thereby yielding catalyst G.

Catalyst H

The procedure of preparation for Catalyst D was followed except for using zirconia ("EP Grade"; Daiichi Kigenso Kogyo K.K.), in place of zirconia ("RC-100"), thereby yielding catalyst H.

Catalyst I

The procedure of preparation for Catalyst D was followed except for using stabilized zirconia ("Ny-8y"; Nippon Shokubai Kagaku Kogyo K.K.), thereby yielding catalyst I.

Catalyst J

The procedure of preparation for Catalyst D was followed except for using pellets prepared by drying at 120° C. and pelletizing, which were then calcined at 500°0 C. for 1 hour, thereby yielding catalyst I.

Catalyst K

The procedure of preparation for Catalyst D was followed except for using an aqueous solution of ruthenium chloride (0.5% by weight of ruthenium based on zirconia) and cobalt nitrate (1.0% by weight of cobalt based on zirconia) at the time of impregnation, thereby yielding catalyst K.

Catalyst L

The procedure of preparation for Catalyst D was followed except for using an aqueous solution of ruthenium chloride (0.5% by weight of ruthenium based on zirconia) and manganese nitrate (1.0% by weight of manganese based on zirconia) at the time of impregnation, thereby yielding catalyst L.

Catalyst M

The procedure of preparation for Catalyst D was followed except for using an aqueous solution of ruthenium chloride (0.5% by weight of ruthenium based on zirconia), cobalt nitrate (1.0% by weight of cobalt based on zirconia) and barium nitrate (2.0% by weight of barium based on zirconia) at the time of impregnation, thereby yielding catalyst M.

Catalyst N

The procedure of preparation for Catalyst D was followed except for using an aqueous solution of ruthenium chloride (0.5% by weight of ruthenium based on zirconia), manganese nitrate (1.0% by weight of manganese based on zirconia) and potassium nitrate (0.5% by weight of barium based on zirconia) at the time of impregnation, thereby yielding catalyst N.

b. Measurement for Pore Characteristics of Catalyst

For the catalysts as prepared hereinabove, the distribution of fine pores of the carrier was measured by means of the mercury intrusion method in the scope of the fine pore sizes ranging from 30 to $3.5 \times 10^5$ Angstroms. The measurement was carried out by using a device (Micromeriticus Autopore 9220; K.K. Shimadzu Seisakusho) in measuring pressures in the range of 14 to 60,000 psi.

From the pore distribution, the pore characteristics of the carriers were given, and the result is shown in Table 1 below.

As described hereinabove, the volume of pores described in these results does not refer to pores having pore sizes smaller than 30 Angstroms and larger than $3.5 \times 10^5$ Angstroms.

c. Example of Reaction for Reforming Hydrocarbon with Steam

Each of the catalysts prepared under item a above was formed into granules having 16 to 32 mesh and a quartz reactor having an inner diameter of 18 mm was filled with 6 ml of the catalyst. The reactor was placed in an heater which was then heated to 600° C. while passing hydrogen gas at a space velocity (SV) of 2,000 hour$^{-1}$ through the catalyst layer for 1 hour, thereby reducing the catalyst. Thereafter, the temperature of the heater was elevated to 800° C. and naphtha was allowed to pass through the catalyst layer, thereby reforming it with steam at the steam/carbon ratio of 4/1, in the space velocity (SV) of 12,000 hour$^{-1}$ under atmospheric pressure, thereby reforming the hydrocarbon with steam. The naphtha used had an average composition as $C_{5.5}H_{13}$ and a sulfur sulfur content of 0.1 ppm or smaller.

After reaction for 8 hour, the reaction conditions were changed to the steam/carbon=2/1 and the space velocity (SV)=9,000 hour$^1$ and the reaction was continued for another 2 hours. Thereafter, a supply of naphtha and steam was stopped, and nitrogen has passed for 1 hour to retain the state in the reactor.

The operation and treatment with nitrogen has been repeated several times, and indications with respect to the catalytic activity and deactivation rate were obtained from the distribution of temperatures of endothermic portions in the reaction region and a variation thereof.

Table 1 below indicates the relative activity and the relative deactivation rate of each of the catalysts when the catalyst D is used as a standard.

kneaded while heating at 80° C. until water was fully evaporated. Thereafter, the mixture was dried at 120° C. over the period of 6 hours and then calcined at 500° C. for 1 hour, thereby yielding a catalyst for reforming with steam. It was found that the catalyst has rhodium and manganese deposited on the zirconia ($ZrO_2$) carrier in the amount of 0.5% by weight and 1.0% by weight, respectively, on the basis of the zirconia carrier.

The catalyst thus prepared was formed into granules with 16 to 32 mesh and filled in a quartz reactor having an inner diameter of 18 mm. The catalyst filled in the reactor was then heated to 600° C. and subjected to reduction with hydrogen. Thereafter, the reaction was then carried out for 8 hours by passing naphtha and steam at the reaction temperature of 800° C. in the steam/carbon ratio (S/C) of 4/1 and the gas space velocity (GHSV) of 12,000 hour$^{-1}$, thereby making the catalytic activity stationary. The composition of the naphtha used was represented by $C_{5.5}H_{13}$ and a sulfur content of 0.1 ppm or lower.

Then, the reaction was continued at the constant temperature of 800° C. while changing the steam/carbon ratio to 2/1 and the gas-space velocity (GHSV) to

TABLE 1

| | CARRIER AND CATALYST SYSTEM | PORE VOLUME ml/g | | AVERAGE PORE SIZE Å | SPECIFIC SURFACE AREA $m^2/g$ | RELATIVE CATALYTIC ACTIVITY | DEACTIVATION RATE |
|---|---|---|---|---|---|---|---|
| | | ≦500 Å | >500 Å | | | | |
| Comparative EX. 1 | A; $Ru/ZrO_2$ | 0.15 | 0.01 | 60 | 131 | 0.7 | 1.0 |
| EX. 1 | B; $Ru/ZrO_2$ | 0.18 | 0.08 | 136 | 88 | 0.9 | 1.0 |
| EX. 2 | C; $Ru/ZrO_2$ | 0.17 | 0.08 | 170 | 66 | 0.9 | 0.7 |
| EX. 3 | D; $Ru/ZrO_2$ | 0.21 | 0.03 | 137 | 60 | 1.0 | 1.0 |
| CO. EX. 2 | E; $Ru/ZrO_2$ | 0.29 | 0.15 | 375 | 49 | 0.8 | 2.0 |
| CO. EX. 3 | F; $Ru/ZrO_2$ | 0.09 | 0.24 | 463 | 32 | 0.6 | 5.4 |
| CO. EX. 4 | G; $Ru/ZrO_2$ | 0.14 | 0.01 | 167 | 42 | 0.8 | 0.7 |
| CO. EX. 5 | H; $Ru/ZrO_2$ | 0.20 | 0.21 | 202 | 93 | 0.9 | 3.1 |
| EX. 4 | I; $Ru/ZrO_2$ | 0.26 | 0.02 | 216 | 61 | 0.9 | 0.4 |
| EX. 5 | J; $Ru/ZrO_2$ | 0.17 | 0.00 | 96 | 75 | 1.0 | 1.0 |
| EX. 6 | K; $Ru$—$Co/ZrO_2$ | 0.21 | 0.03 | 137 | 60 | 1.0 | 0.1 |
| EX. 7 | L; $Ru$—$Mn/ZrO_2$ | 0.21 | 0.03 | 137 | 60 | 1.0 | 0.1 |
| EX. 8 | M; $Ru$—$Mn$—$Ba/ZrO_2$ | 0.21 | 0.03 | 137 | 60 | 1.0 | <0.1 |
| EX. 9 | N; $Ru$—$Mn$—$K/ZrO_2$ | 0.21 | 0.03 | 137 | 60 | 1.0 | <0.1 |

Evaluation

As is shown in Table 1 above, the carriers used for the catalysts in Examples 1 to 9 were found to have the distribution of pores (pore characteristics) as defined to be contained in the range of the present invention.

As is apparent from Table 1 above, the catalyst according to the present invention using the carriers having the distribution of pores (pore characteristics) as defined so as to be encompassed within the scope of the present invention can retain a high catalytic activity and deactivation rate to an extremely low and slow extent.

EXAMPLE 10

The carrier was prepared by calcining 200 grams of zirconium hydroxide at 500° C. for 1 hour, thereby yielding zirconia ($ZrO_2$). The pore characteristics of this zirconia carrier were measured in the same manner as in Example 1, and the results are shown in Table 2 below.

A solution was prepared by dissolving 100 grams of the resulting zirconia carrier in water, and another solution was separately prepared by dissolving 1.3 grams of rhodium chloride ($RhCl_3 \cdot 3H_2O$) and 5.0 grams of manganese nitrate ($Mn(NO_3)_2 \cdot 6H_2O$). The two solutions were mixed to make 300 ml, and the mixture was wet- 9,000 hour$^{-1}$. Thereafter, the supply of naphtha and steam was stopped and this state was retained for 1 hour after introduction of nitrogen.

This operation for reaction and retaining the state by introduction of nitrogen was repeated several times, thereby obtaining indications for the catalytic activity and deactivation rate from the distribution of temperatures in an endothermic portions in the reaction region and a variation thereof.

Table 2 below shows relative values on the basis of Comparative Example 6 as a standard.

EXAMPLES 11, 14 & 15 AND COMPARATIVE EXAMPLES 6-11

In the same manner as in Example 10, the zirconia carrier was prepared by calcining zirconium hydroxide at 500° C. for 1 hour.

The pore characteristics of the resulting zirconia carrier were measured in the same manner as in Example 1, and the results are shown in Table 2 below.

The resulting zirconia carrier was impregnated in a mixture of an aqueous solution of rhodium chloride or ruthenium chloride with an aqueous solution of manganese nitrate or cobalt nitrate, and the mixture was kneaded at 80° C. until the water was evaporated followed by drying at 120° C. for 6 hours.

Thereafter, the dried material was calcined at 500° C. for 1 hour, thereby resulting in the respective catalysts (Examples 11, 14 and 15).

In Comparative Example 6, the catalyst was prepared by impregnating zirconia with an aqueous solution of rhodium chloride. In Comparative Example 10, the catalyst was prepared by impregnating zirconia with an aqueous solution of ruthenium chloride. In Comparative Examples 7, 8, 9 and 11, the catalysts were prepared by impregnating zirconia in a solution of rhodium chloride or ruthenium chloride in a barium salt, a potassium salt and a nickel salt, respectively.

In Examples and Comparative Examples, the amounts of rhodium or ruthenium deposited are each

EXAMPLE 18

The procedure of Example 11 was repeated in the same manner, except for changing the amount of cobalt deposited on zirconia in the range from 0.25 to 5.0% by weight based on the weight of zirconia.

Figure 1:
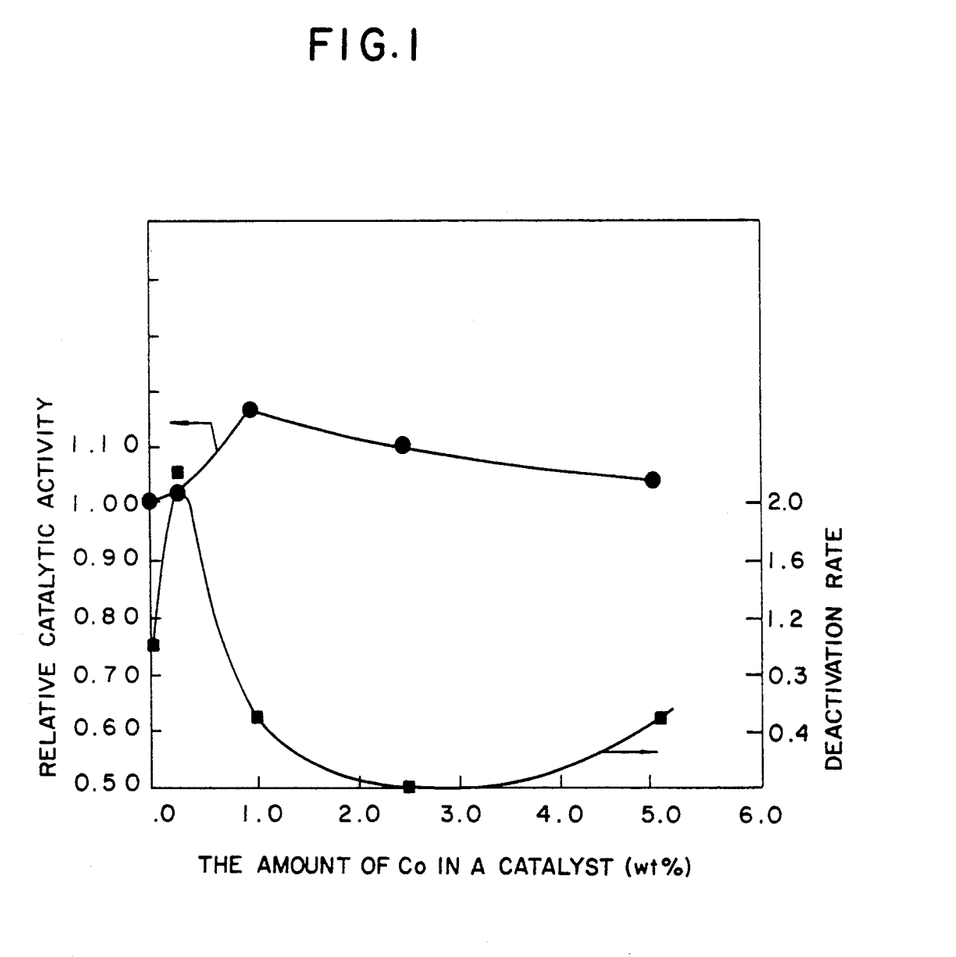
FIG. 1 is a graph showing the relationship of the amount of an element deposited for providing a promoter function with catalyst performance in the case of a rhodium type catalyst.

The results are shown in FIG. 1.

EXAMPLE 19

The procedure of Example 6 was repeated in the same manner, except for changing the amount of cobalt deposited on zirconia in the range from 0.25 to 2.5% by weight based on the weight of zirconia.

The results are shown in FIG. 1.

TABLE 2

| CATALYST | | PORE VOLUME ml/g | | AVERAGE PORE SIZE Å | SPECIFIC SURFACE AREA $m^2/g$ | RELATIVE CATALYST ACTIVITY | DEACTIVATION RATE |
|---|---|---|---|---|---|---|---|
| | | $\leq 500$ Å | $>500$ Å | | | | |
| EX. 11 | Rh—Co/ZrO$_2$ | 0.14 | 0.08 | 70 | 103 | 1.16 | 0.5 |
| EX. 12 | Rh—Co—Ba/ZrO$_2$ | 0.14 | 0.08 | 70 | 103 | 1.02 | 0.1> |
| EX. 13 | Rh—Mn—K/ZrO$_2$ | 0.14 | 0.08 | 70 | 103 | 1.01 | 0.1> |
| CO. EX. 6 | Rh/ZrO$_2$ (STANDARD) | 0.14 | 0.08 | 70 | 103 | 1.00 | 1.0 |
| CO. EX. 7 | Rh—Ba/ZrO$_2$ | 0.14 | 0.08 | 70 | 103 | 0.81 | 0.1> |
| CO. EX. 8 | Rh—K/ZrO$_2$ | 0.14 | 0.08 | 70 | 103 | 0.76 | 0.1> |
| CO. EX. 9 | Rh—Ni/ZrO$_2$ | 0.14 | 0.08 | 70 | 103 | 1.09 | 1.0 |

TABLE 3

| CATALYST | | PORE VOLUME ml/g | | AVERAGE PORE SIZE Å | SPECIFIC SURFACE AREA $m^2/g$ | RELATIVE CATALYTIC ACTIVITY | DEACTIVATION RATE |
|---|---|---|---|---|---|---|---|
| | | $\leq 500$ Å | $>500$ Å | | | | |
| EX. 14 | Ru—Mn/ZrO$_2$ | 0.14 | 0.08 | 70 | 103 | 0.98 | 0.1 |
| EX. 15 | Ru—Co/ZrO$_2$ | 0.14 | 0.08 | 70 | 103 | 0.96 | 0.1 |
| EX. 16 | Ru—Co—Ba/ZrO$_2$ | 0.14 | 0.08 | 70 | 103 | 0.95 | 0.1> |
| EX. 17 | Ru—Co—Ba/YSZ | 0.21 | 0.01 | 60 | 120 | 1.03 | 0.1> |
| EX. 18 | Ru—Mn—K/ZrO$_2$ | 0.14 | 0.08 | 70 | 103 | 0.95 | 0.1> |
| CO. EX. 10 | Ru/ZrO$_2$ (STANDARD) | 0.14 | 0.08 | 70 | 103 | 1.00 | 1.0 |
| CO. EX. 11 | Ru—Ba/ZrO$_2$ | 0.14 | 0.08 | 70 | 103 | 0.62 | 0.1> |

0.5% by weight on the basis of the weight of zirconia. The amounts of manganese, cobalt and nickel are each 1.0% by weight based on the weight of zirconia, while the amounts of barium and potassium are 2.0% by weight and 0.5% by weight, respectively, on the basis of the weight of the carrier.

The catalysts thus prepared were evaluated in the same manner as in Example 10. The results as shown in Tables 2 and 3 are represented as relative values on the basis of Comparative Examples 1 and 5 as standards, respectively.

EXAMPLES 12-13 AND 16-17

The catalysts were prepared in substantially the same manner as in Example 10, except for impregnation of zirconia carrier or commercially available yttrium-stabilized zirconia (ySZ) in a mixture of an aqueous solution of rhodium chloride or ruthenium chloride, an aqueous solution of manganese nitrate or cobalt nitrate and an aqueous solution of barium nitrate or potassium nitrate.

The resulting catalysts were evaluated in the same manner as in Example 10.

The amounts of cobalt and manganese were each 1.5% by weight, the amount of barium was 1.0% by weight, and the amount of potassium was 0.25% by weight, based on the weight of zirconia.

The results are shown in Tables 2 and 3 below.

Evaluation

As is apparent from Table 2 above, the catalysts used in Examples 10 and 11 having manganese and cobalt, in addition to ruthenium, respectively, deposited on the zirconia carrier are superior in the catalytic activity to and lower in the deactivation rate than the catalyst used in Comparative Example 6 having only ruthenium deposited on the zirconia carrier.

It is further to be noted that the catalysts used in Example 12, in which cobalt and barium are deposited, together with ruthenium, on the zirconia carrier, and in Example 13, in which manganese and potassium are deposited, together with ruthenium, on the zirconia carrier, are particularly low in deactivation rate.

From Table 3, it is found that, as compared with the catalyst used in Comparative Example 10 where ruthenium only is deposited on the zirconia carrier, a remarkably low deactivation rate has been achieved without a decrease in the catalytic activity by the catalysts used in Examples 14 and 15 having manganese and cobalt, in addition to ruthenium, respectively, deposited on the zirconia carrier, the catalyst used in Example 16, in which cobalt and barium are deposited, together with ruthenium, on the zirconia carrier, and the catalyst used in Example 18, in which manganese and potassium are deposited, together with ruthenium, on the zirconia carrier. Further, the catalyst used in Example 17 in which a partially stabilized zirconia carrier is employed is particularly high in the catalytic activity and remarkably low in the deactivation rate.

Referring now to FIG. 1, it is shown that the catalysts for reforming the hydrocarbon with steam having rhodium deposited are appropriate when the promoter component is deposited in the amount ranging from 1.0 to 5.0% by weight.

Figure 2:
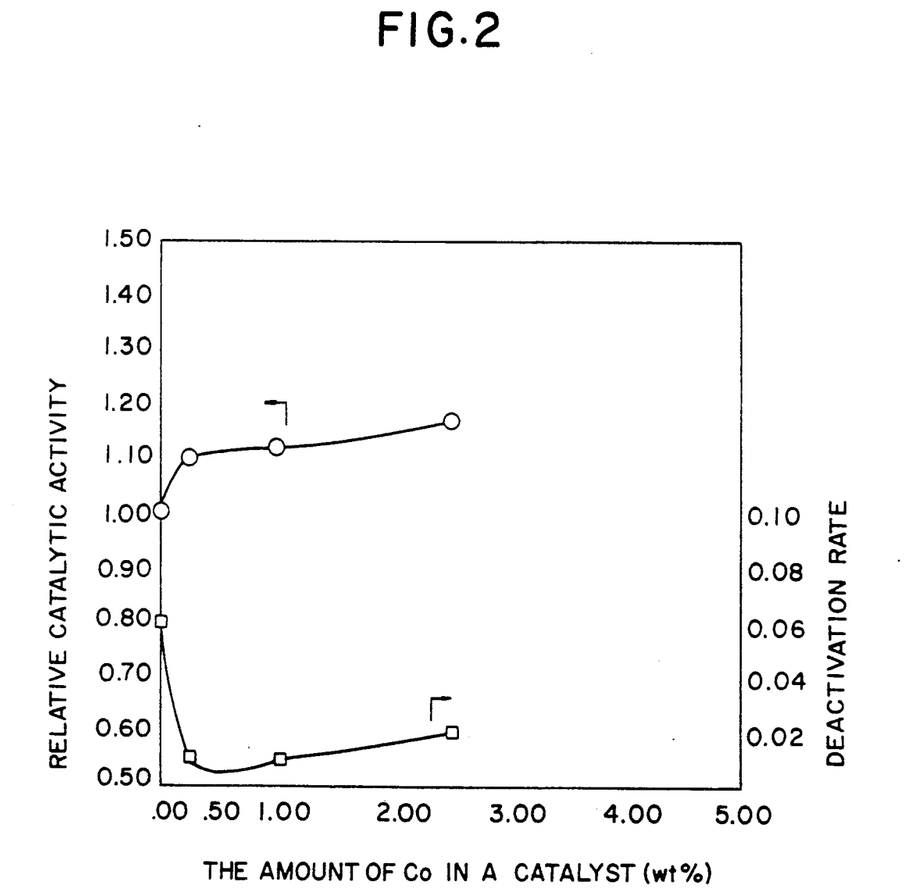
FIG. 2 is a graph showing the relationship of the amount of an element deposited for providing a promoter function with catalyst performance in the case of a ruthenium type catalyst.

FIG. 2 shows that the catalysts for reforming the hydrocarbon with steam having ruthenium deposited are appropriate when the promoter component is deposited in the amount ranging from 1.0 to 2.5% by weight.

The present invention can provide the catalysts for reforming the hydrocarbon with steam having remarkably favorable advantages, such as a high catalytic activity and a long catalytic life, by using the carrier having particular fine pore structures as a catalyst carrier. Further, the catalysts according to the present invention have the particular main catalyst component and the particular promoter components deposited on the catalyst carrier so that they can block carbon from precipitating to a remarkable extent, thereby prolonging their catalytic life, and maintain their high catalytic activity even in a low steam/carbon ratio and a high space velocity.

What is claimed is:

1. A catalyst for reforming a hydrocarbon with steam, wherein a platinum group metal is deposited on a carrier, comprising at least one of zirconia and stabilized zirconia, which has a volume of pores, with pore sizes of 500 Angstroms or smaller, of 0.15 ml per gram or greater, a volume of pores having pore sizes of more than 500 Angstroms of 0.14 ml per gram or smaller; and an average pore size of 90 Angstroms or greater.

2. A catalyst as claimed in claim wherein the platinum group metal is at least one metal of rhodium and ruthenium.

3. A catalyst as claimed in claim 1, wherein at least one metal of cobalt and manganese is deposited on the carrier as a promoter component.

4. A catalyst as claimed in claim 1, wherein at least one metal of cobalt and manganese and at least one metal of potassium and barium are deposited on the carrier as promoter components.

5. A catalyst as claimed in claim 1, wherein an amount of the platinum group metal deposited ranges from 0.01% to 5% by weight with respect to the weight of the carrier.

6. A catalyst as claimed in claim 3 wherein an amount of cobalt and/or manganese deposited ranges from 0.1% to 10% by weight with respect to the weight of the carrier.

7. A catalyst as claimed in claim 4, wherein an amount of cobalt and/or manganese deposited ranges from 0.1% to 10% by weight with respect to the weight of the carrier and an amount of potassium and/or barium deposited ranges from 0.01% to 2.5% by weight with respect to the weight of the carrier.

8. In a catalyst for reforming a hydrocarbon with steam to be used for a reaction wherein the hydrocarbon is reformed with steam, a catalyst having a platinum group metal deposited on a carrier comprising at least one of zirconia and stabilized zirconia as well as having a volume of pores with pore sizes of 500 Angstroms or smaller being 0.15 ml per gram or greater, a volume of pores having pore sizes of more than 500 Angstroms being 0.14 ml per gram or smaller; and an average pore size being 90 Angstroms or greater.

9. A catalyst as claimed in claim 8, wherein the platinum group metal is at least one metal of rhodium and ruthenium.

10. A catalyst as claimed in claim 8, wherein at least one metal of cobalt and manganese is deposited on the carrier as a promoter component.

11. A catalyst as claimed in claim 8, wherein at least one metal of cobalt and manganese and at least one metal of potassium and barium are deposited on the carrier as promoter components.

12. A catalyst as claimed in claim 8, wherein an amount of the platinum group metal deposited ranges from 0.01% to 5% by weight with respect to the weight of the carrier.

13. A catalyst as claimed in claim 8 wherein an amount of cobalt and/or manganese deposited ranges from 0.1% to 10% by weight with respect to the weight of the carrier.

14. A catalyst as claimed in claim 8, wherein an amount of potassium and/or barium deposited range from 0.01% to 2.5% by weight with respect to the weight of the carrier and an amount of cobalt and/or manganese deposited ranges from 0.1% to 10% by weight with respect to the weight of the carrier.

15. A catalyst as claimed in claim 8, wherein the catalyst is used in a steam/carbon ratio ranging from 1/1 to 12/1.

16. A catalyst as claimed in claim 8, wherein the catalyst is used at a reaction temperature ranging from 500° C. to 900° C.

17. A catalyst as claimed in claim 8, wherein the catalyst is used at a reaction pressure ranging from 0 to 50 kg/cm$^2$G.

18. In a catalyst for reforming a hydrocarbon with steam to be used for a reaction wherein the hydrocarbon is reformed with steam, a catalyst having a platinum group metal deposited on a carrier comprising at least one of zirconia and stabilized zirconia as well as consisting essentially of a volume of pores with pore sizes of 500 Angstroms or smaller being 0.15 ml per gram or greater, a volume of pores having pore sizes of more than 500 Angstroms being 0.14 ml per gram or smaller, and an average pore size being 90 Angstroms or greater.

19. A catalyst for reforming a hydrocarbon with steam comprising at least one of rhodium and ruthenium and at least one of cobalt and manganese deposited on a carrier comprising at least one of zirconium and stabilized zirconium, wherein said carrier has an average pore size of at least 90 Angstroms; a pore volume for its pores of at most 500 Angstroms, of at least 0.15 ml/gm; and a pore volume, for its pores of more than 500 Angstroms, of at most 0.14 ml/gm.

* * * * *